United States Patent
Ota

(10) Patent No.: US 9,164,720 B2
(45) Date of Patent: Oct. 20, 2015

(54) SERVER, IMAGE PROCESSING DEVICE, AND IMAGE PROCESSING SYSTEM

(71) Applicant: BROTHER KOGYO KABUSHIKI KAISHA, Nagoya-shi, Aichi-ken (JP)

(72) Inventor: Yuichi Ota, Anjo (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 158 days.

(21) Appl. No.: 13/686,670

(22) Filed: Nov. 27, 2012

(65) Prior Publication Data

US 2013/0135677 A1   May 30, 2013

(30) Foreign Application Priority Data

Nov. 28, 2011  (JP) ................................. 2011-258740

(51) Int. Cl.
*G06F 3/12* (2006.01)

(52) U.S. Cl.
CPC ............ *G06F 3/1296* (2013.01); *G06F 3/1204* (2013.01); *G06F 3/1226* (2013.01); *G06F 3/1232* (2013.01); *G06F 3/1288* (2013.01); *G06F 3/1239* (2013.01)

(58) Field of Classification Search
CPC .................................................... G06F 3/1296
See application file for complete search history.

(56) References Cited

U.S. PATENT DOCUMENTS

| 2010/0007905 A1 | 1/2010 | Murashita |
| 2012/0212759 A1 | 8/2012 | Murata |
| 2012/0250108 A1 * | 10/2012 | Wilsher et al. ................ 358/475 |

FOREIGN PATENT DOCUMENTS

| JP | 2001-265551 A | 9/2001 |
| JP | 2003-330686 A | 11/2003 |
| JP | 2004-118426 A | 4/2004 |
| JP | 2010-020403 A | 1/2010 |
| JP | 2012-174124 A | 9/2012 |

* cited by examiner

*Primary Examiner* — Saeid Ebrahimi Dehkord
*Assistant Examiner* — Lennin Rodriguezgonzale
(74) *Attorney, Agent, or Firm* — Merchant & Gould PC

(57) ABSTRACT

A server is provided that includes a connection unit configured to establish connections with an information processing device and a plurality of image processing devices, a first receiving unit configured to receive image processing device information for identifying a specified one of the plurality of image processing devices that is to be used by the information processing device, from the specified image processing device, a second receiving unit configured to receive information processing device information for identifying the information processing device, from the specified image processing device, and a transmission unit configured to transmit, to the information processing device identified by the information processing device information, a display instruction for causing the information processing device to display thereon the specified image processing device identified by the image processing device information.

11 Claims, 11 Drawing Sheets

| PRINTER NAME | ID | PRINTER INFORMATION | PC INFORMATION | JOB TRANSMISSION TIME | PRINTER OPERATION |
|---|---|---|---|---|---|
| PRINTER 100 | ACCOUNT 1 | 192.168.0.1 | 200.168.0.1 | 2011/10/1 13:00 | 1 |
| PRINTER 101 | ACCOUNT 1 | 192.168.0.10 | 200.168.0.10 | 2011/10/1 13:00 | 0 |

| PC NAME | ID | PC INFORMATION | LOGIN | LOGIN TIME |
|---|---|---|---|---|
| PC 200 | ACCOUNT 1 | 200.168.0.1 | ON | 2011/10/1 12:58 |
| PC 201 | ACCOUNT 2 | 200.168.0.10 | OFF | 2011/10/2 12:00 |

| PRINTER NAME | ID | PRINTER INFORMATION | PC INFORMATION | JOB TRANSMISSION TIME | PRINTER OPERATION |
|---|---|---|---|---|---|
| PRINTER 100 | ACCOUNT 1 | 192.168.0.1 | 200.168.0.1 | 2011/10/1 13:00 | 1 |
| PRINTER 101 | ACCOUNT 2 | 192.168.0.10 | 200.168.0.1 | 2011/10/1 13:00 | 0 |

SERVER, IMAGE PROCESSING DEVICE, AND IMAGE PROCESSING SYSTEM

CROSS-REFERENCE TO RELATED APPLICATION

This application claims priority under 35 U.S.C. §119 from Japanese Patent Application No. 2011-258740 filed on Nov. 28, 2011. The entire subject matter of the application is incorporated herein by reference.

BACKGROUND

1. Technical Field

The following description relates to one or more techniques for an image processing system that includes a server that is connected with an information processing device and an image processing device and configured to transfer image data from the information processing device to the image processing device and cause the image processing device to perform image processing.

2. Related Art

A printing system has been known that includes an information processing device, a printing device (an image processing device), and a print limiting server interconnected with each other via a network. The printing system is configured to transfer print data from the information processing device to the printing device via the print limiting server and cause the printing device to perform printing. As an example of the known printing system, a technique has been proposed in which when a user utilizes the printing device, the information processing device queries the print limiting server, and the print limiting server allows the printing device to perform printing on the condition that the number of sheets which the user wishes to print is not more than the upper limit number of printable sheets. The printing system may include a plurality of printing devices connected with the network.

SUMMARY

However, the proposed printing system has a problem that, when there are a plurality of printing devices connected with the network, it is difficult for a user of an information processing device (such as a personal computer) to identify an intended one of the plurality of printing devices that the user is to utilize.

Aspects of the present invention are advantageous to provide one or more improved techniques, for an image processing system, which allow a user of an information processing device to easily identify an intended image processing device that the user is to utilize.

According to aspects of the present invention, a server is provided that includes a connection unit configured to connect with an information processing device and a plurality of image processing devices, a first receiving unit configured to receive image processing device information for identifying a specified one of the plurality of image processing devices that is to be used by the information processing device, from the specified image processing device via the connection unit, a second receiving unit configured to receive information processing device information for identifying the information processing device, from the specified image processing device via the connection unit, and a transmission unit configured to transmit, to the information processing device identified by the information processing device information, a display instruction for causing the information processing device to display thereon the specified image processing device identified by the image processing device information, via the connection unit.

According to aspects of the present invention, further provided is an image processing device that includes a connection unit configured to connect with a server, which is configured to mediate communication between the image processing device and the information processing device so as to allow the image processing device to communicate with the information processing device via the server, an accepting unit configured to accept an entry of information processing device information for identifying the information processing device that is to use the image processing device, a transmission unit configured to transmit, to the server via the connection unit, image processing device information for identifying the image processing device and the information processing device information accepted by the accepting unit, so as to allow the server to transmit, to the information processing device identified by the information processing device information, display instruction for causing the information processing device to display thereon the image processing device identified by the image processing device information.

According to aspects of the present invention, further provided is an image processing system that includes an information processing device, a plurality of image processing devices, and a server configured to mediate communication between the information processing device and the plurality of image processing devices so as to allow the information processing device to communicate with the plurality of image processing devices via the server. Each of the plurality of image processing devices includes a connection unit configured to connect with the server, an accepting unit configured to accept an entry of information processing device information for identifying the information processing device that is to use the image processing device, a transmission unit configured to transmit, to the server, image processing device information for identifying the image processing device and the information processing device information accepted by the accepting unit via the connection unit. The server includes a server-side connection unit configured to connect with the information processing device and the plurality of image processing devices, a first receiving unit configured to receive the image processing device information for identifying a specified one of the plurality of image processing devices that is to be used by the information processing device, from the specified image processing device via the server-side connection unit, a second receiving unit configured to receive the information processing device information for identifying the information processing device, from the specified image processing device via the server-side connection unit, and a server-side transmission unit configured to transmit, to the information processing device identified by the information processing device information, a display instruction for causing the information processing device to display thereon the specified image processing device identified by the image processing device information received by the first receiving unit, via the server-side connection unit. The information processing device is configured to, upon receipt of the display instruction from the server, display thereon the specified image processing device identified by the image processing device information.

According to aspects of the present invention, further provided is a server that includes a communication unit configured to communicate with an image forming device configured to form an image on a sheet and an information processing device via a network, and a controller configured to receive first device information that identifies the image forming device on the network and first user information that identifies a user who uses the image forming device, from the image forming device via communication unit, receive second device information that identifies the information processing device on the network and second user information that identifies a user who uses the information processing device, from the information processing device via the communication unit, receive trigger information from the image forming device via the communication unit, determine whether the user identified by the first user information and the user identified by the second user information are coincident with each other, when the trigger information is received via the communication unit from the image forming device identified by the first device information, transmit, via the communication unit to the information processing device identified by the second device information, a display instruction to cause the information processing device to display information about the image forming device identified by the first device information, when determining that the user identified by the first user information and the user identified by the second user information are coincident with each other, and avoid transmitting the display instruction to the information processing device identified by the first device information, when determining that the user identified by the first user information and the user identified by the second user information are not coincident with each other.

BRIEF DESCRIPTION OF THE ACCOMPANYING DRAWINGS

FIG. 3 exemplifies a printer management table in the first, third, and fourth embodiments according to one or more aspects of the present invention.

FIG. 4 exemplifies a PC management table in the first to fourth embodiments according to one or more aspects of the present invention.

Figure 5:
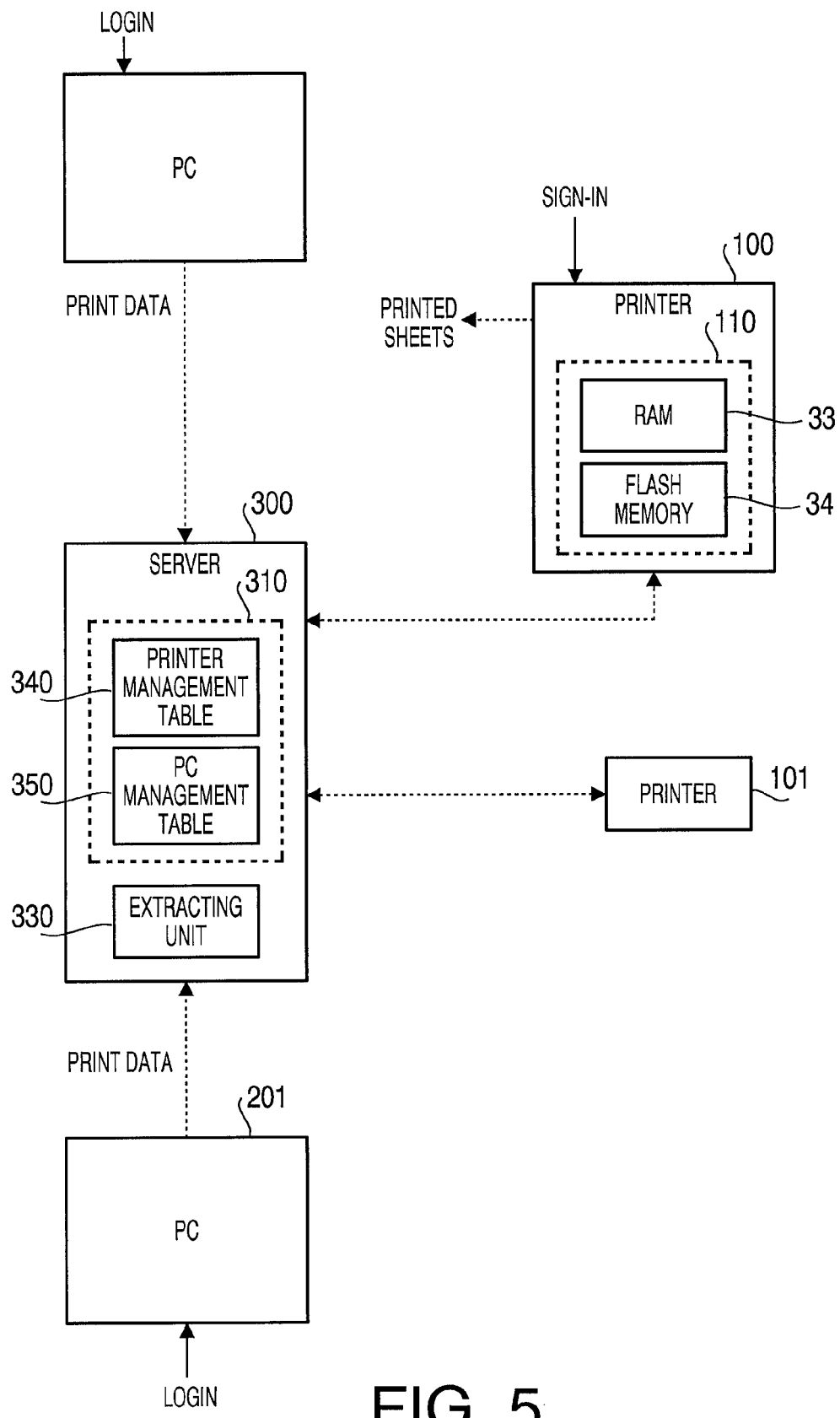

FIG. 5 is a block diagram schematically illustrating operations of the image processing system in the first to fourth embodiments according to one or more aspects of the present invention.

Figure 6:
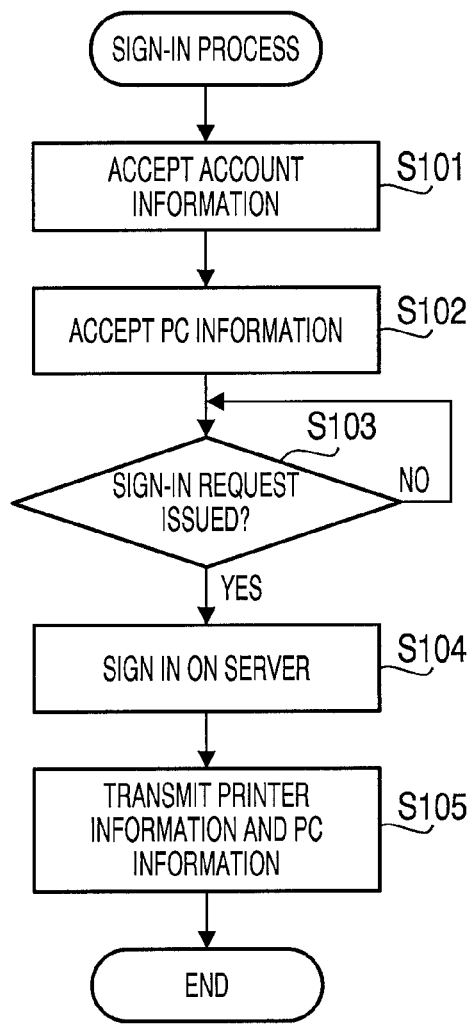

FIG. 6 is a flowchart showing a procedure of a sign-in process to be executed by the printer in the first and second embodiments according to one or more aspects of the present invention.

Figure 7:
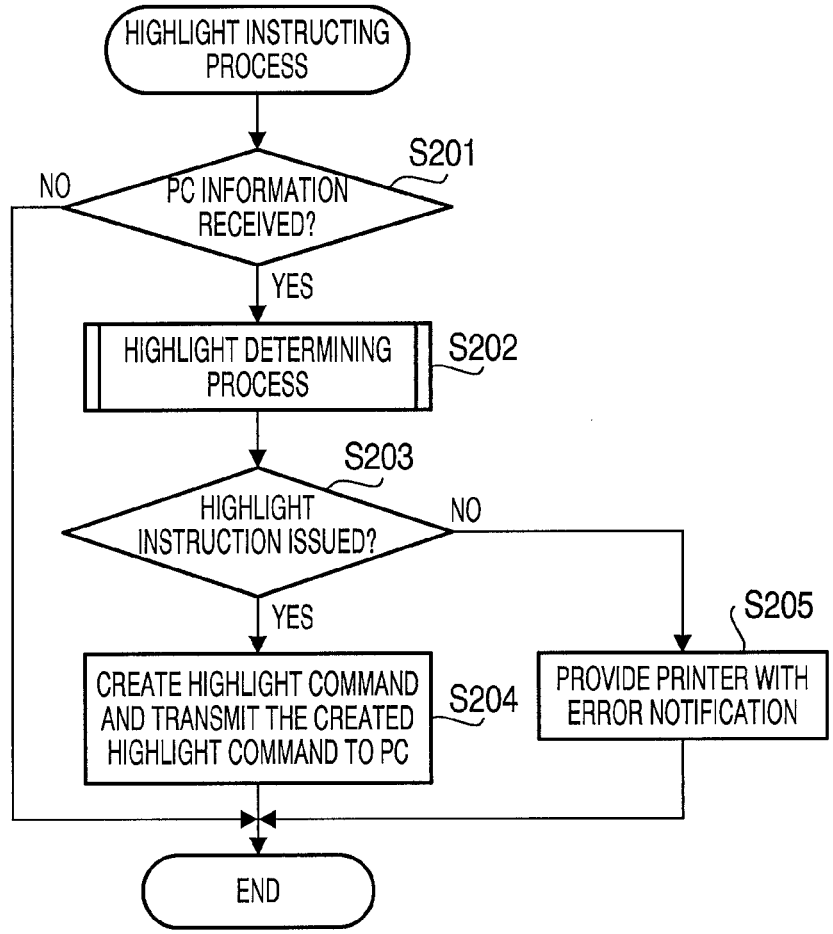

FIG. 7 is a flowchart showing a procedure of a highlight instructing process to be executed by the management server in the first to fourth embodiments according to one or more aspects of the present invention.

Figures 8, 9:
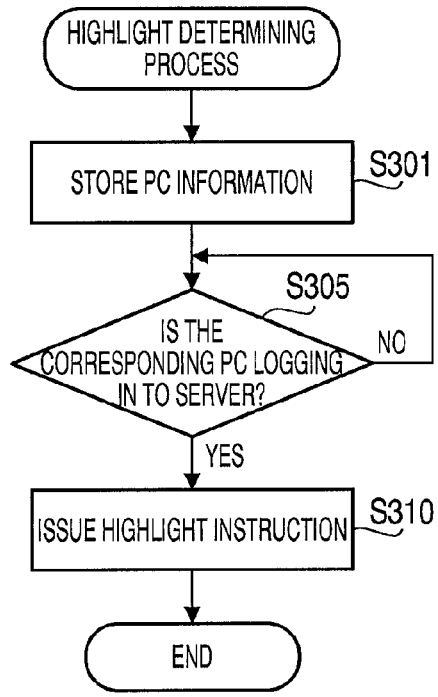

FIG. 8 is a flowchart showing a procedure of a highlight determining process to be executed by the management server in the first embodiment according to one or more aspects of the present invention.

FIG. 9 exemplifies a printer management table in the second embodiment according to one or more aspects of the present invention.

Figure 10:
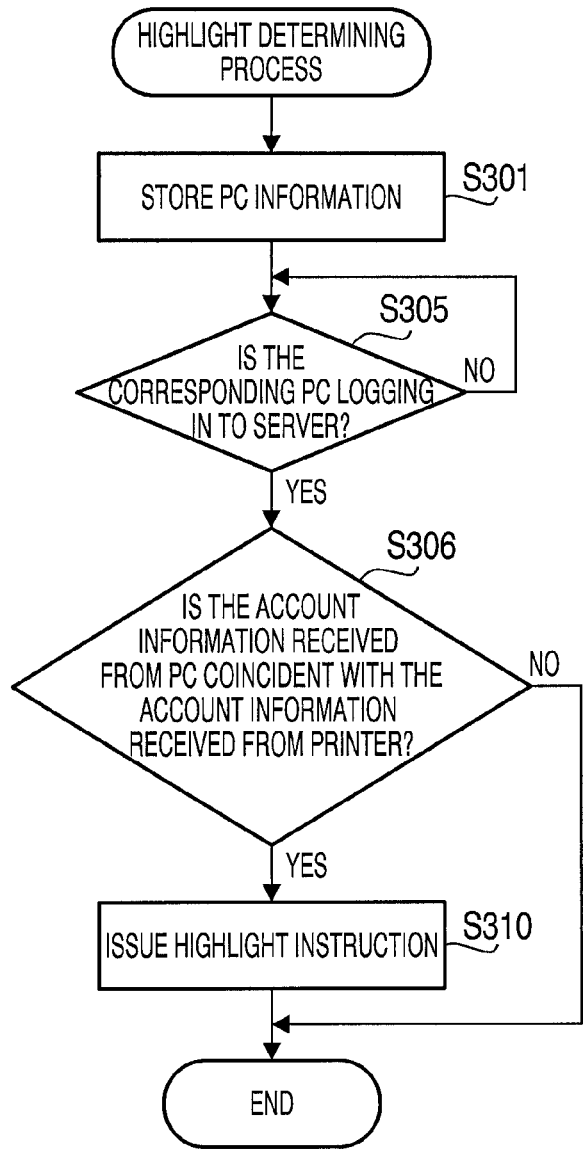

FIG. 10 is a flowchart showing a procedure of a highlight determining process to be executed by the management server in the second embodiment according to one or more aspects of the present invention.

Figure 11:
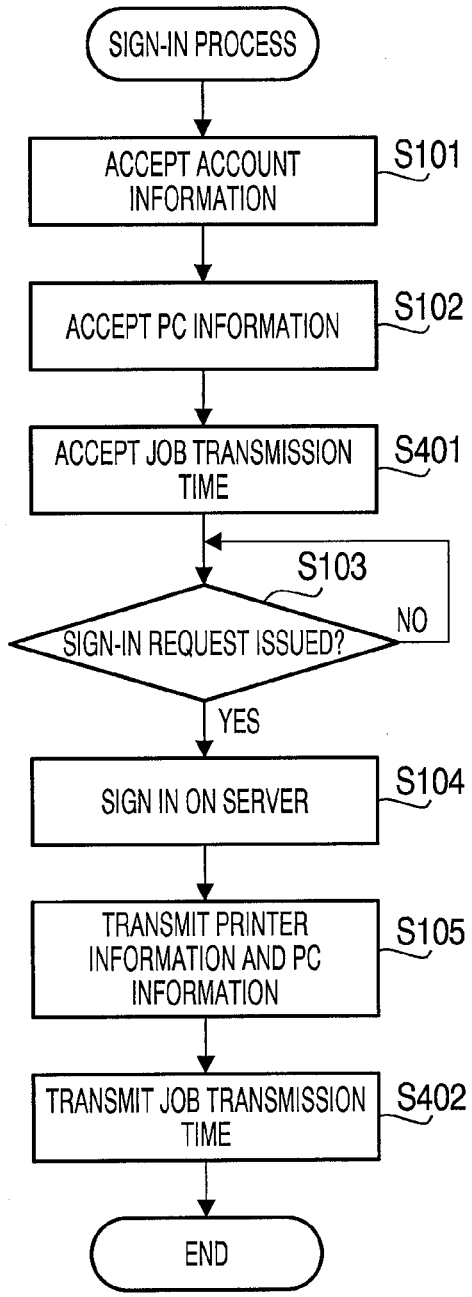

FIG. 11 is a flowchart showing a procedure of a sign-in process to be executed by the printer in the third and fourth embodiments according to one or more aspects of the present invention.

Figure 12:
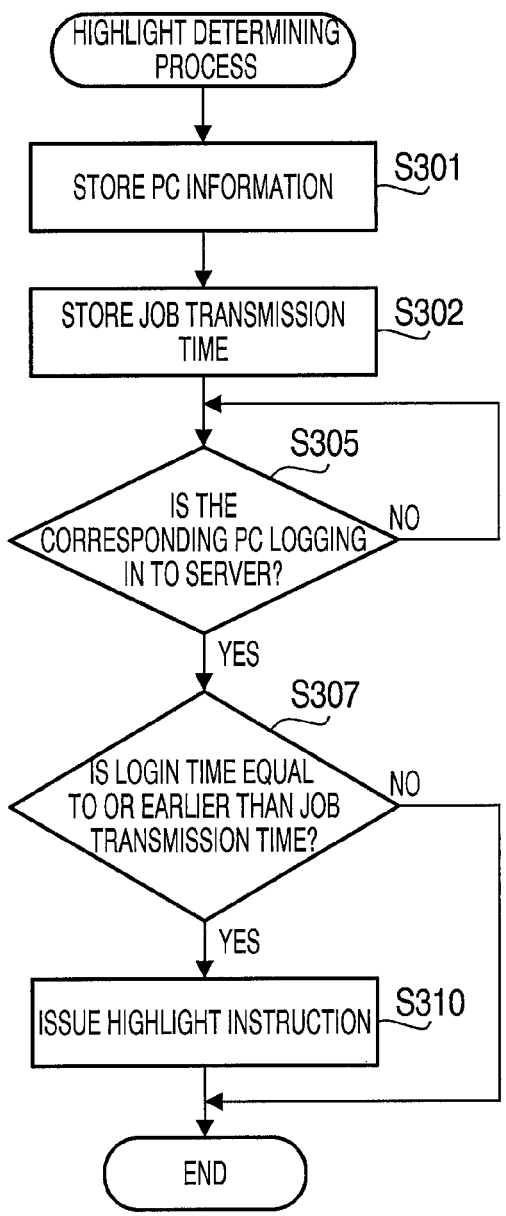

FIG. 12 is a flowchart showing a procedure of a highlight determining process to be executed by the management server in the third embodiment according to one or more aspects of the present invention.

Figure 13:
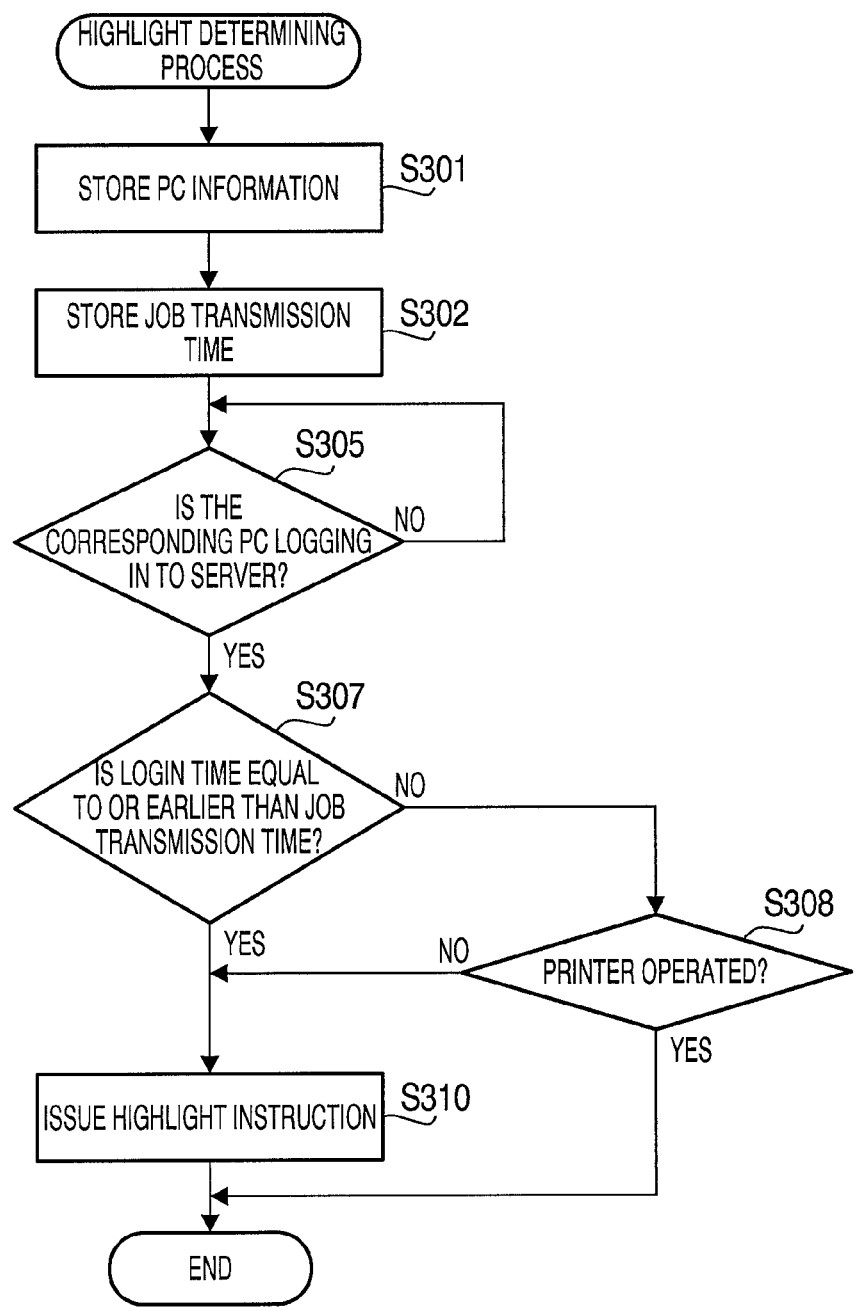

FIG. 13 is a flowchart showing a procedure of a highlight determining process to be executed by the management server in the fourth embodiment according to one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer readable media including but not limited to RAMs, ROMs, flash memories, EEPROMs, CD-media, DVD-media, temporary storage, hard disk drives, floppy drives, permanent storage, and the like.

Hereinafter, embodiments according to aspects of the present invention will be described in detail with reference to the accompanying drawings. In the embodiments, aspects of the present invention are applied to a printer that has a function to acquire print data to be printed from a Web page and print the acquired print data.

First Embodiment

Configuration of Printer

Figure 1:
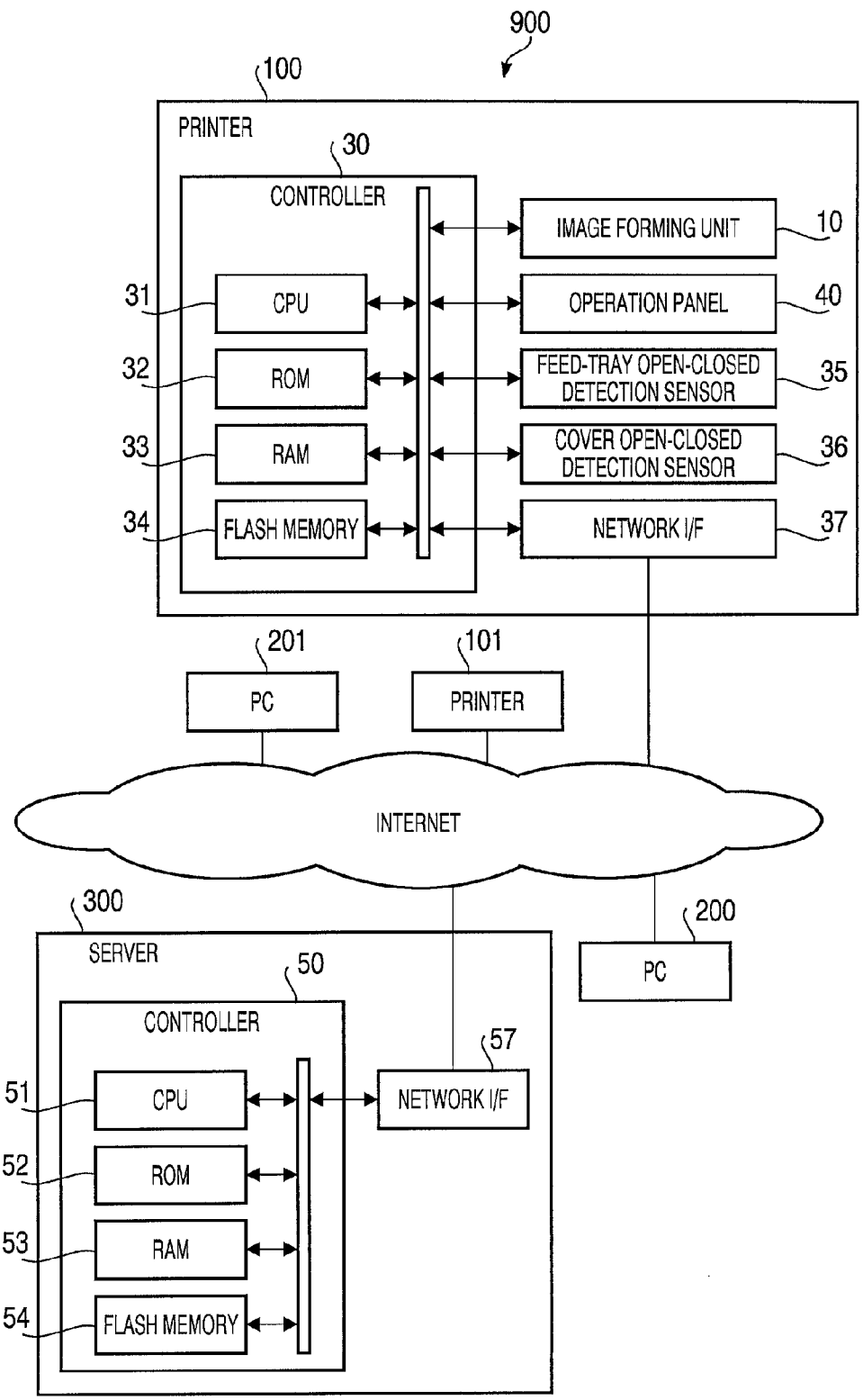
FIG. 1 is a block diagram schematically showing a configuration of an image processing system and electrical configurations of a printer and a management server in first to fourth embodiments according to one or more aspects of the present invention.

As shown in FIG. 1, a printer 100 of a first embodiment includes a controller 30 that includes a CPU 31, a ROM 32, a RAM 33, and a flash memory 34. Further, the controller 30 is electrically connected with an image forming unit 10 configured to form an image on a sheet, an operation panel 40 configured to display an operational status and accept an input operation from a user, a feed-tray open-closed detection sensor 35 configured to detect whether a below-mentioned feed tray 91 is open or closed, a cover open-closed detection sensor 36 configured to detect whether a cover for below-mentioned process units 50 is open or closed (it is noted that the cover is opened for replacement of toner), and a network interface 37.

The ROM 32 stores control programs (firmware) for controlling the printer 100, and various settings and initial values. The RAM 33 and the flash memory 34 are utilized as work areas for loading various control programs thereinto or storage areas for temporarily storing print data.

The flash memory 34 is a non-volatile memory configured to retain data even after the printer 100 is turned off. The flash memory 34 is used as a storage area to store various settings that are configured by a user after shipment.

The CPU 31 is configured to control elements included in the printer 100 while storing processing results into the RAM 33 or the flash memory 34 in accordance with the control programs read out from the ROM 32 and/or signals received from various sensors.

The network interface 37 is an interface for achieving communication with other devices. The printer 100 receives data from the other devices via the network interface 37.

In the first embodiment, the printer 100 is configured to communicate with a personal computer (PC) 200 and a management server 300 via the network interface 37. Together with the PC 200 and a management server 300, the printer 100 forms an image processing system 900.

The operation panel 40 includes various buttons for accepting user operations, and a touch panel screen configured to display various types of information such as textual information and buttons. The various buttons of the operation panel 40 include an "OK" button for providing an instruction to start a printing operation and a "CANCEL" button for providing an instruction to cancel the printing operation.

[Configuration of Image Forming Unit of Printer]

Subsequently, a configuration of the image forming unit 10 of the printer 100 will be described with reference to FIG. 2. The image forming unit 10 includes process units 50 configured to electro-photographically form toner images and transfer the toner images onto a sheet, a fuser 8 configured to fix the toner images onto the sheet, a feed tray 91 configured to hold unprinted sheets (on which any toner image has not been transferred) placed thereon, and a catch tray 92 configured to hold printed sheets (on which toner images have been transferred) placed thereon. There is an image reading unit 20 disposed above the image forming unit 10.

Further, the image forming unit 10 includes an exposure unit 53 configured to emit light beams onto the process units 50Y, 50M, 50C, and 50K, and a conveying belt 7 configured to convey a sheet to respective transfer positions of the process units 50Y, 50M, 50C, and 50K.

Figure 2:
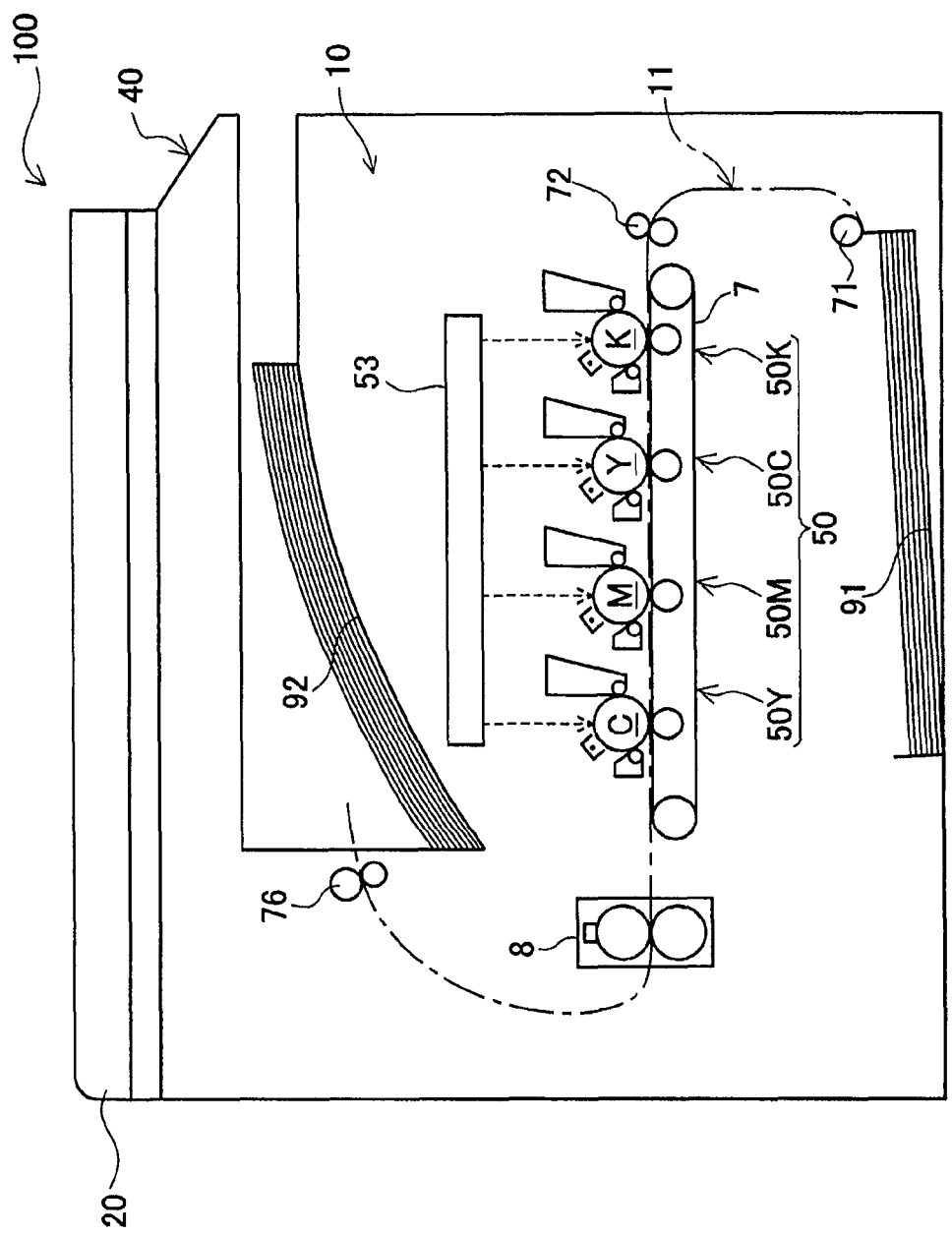
FIG. 2 is a cross-sectional side view schematically showing a configuration of the printer in the first to fourth embodiments according to one or more aspects of the present invention.

Further, in the image forming unit 10, there is provided a substantially S-shaped feeding path 11 (see a long dashed short dashed line in FIG. 2). The feeding path 11 is configured to guide a sheet placed on the feed tray 91 (disposed at a bottom portion of the image forming unit 10) upward to the catch tray 92 via a pickup roller 71, registration rollers 72, the process unit 50, and the fuser 8.

The process units 50 (50Y, 50M, 50C, and 50K), which respectively correspond to four colors, i.e., cyan (C), magenta (M), yellow (Y), and black (K), are arranged in parallel with each other. Specifically, the process units 50 include the process unit 50Y configured to form a yellow image, the process unit 50M configured to form a magenta image, the process unit 50C configured to form a cyan image, and the process unit 50K configured to form a black image.

The image forming unit 10 picks up the sheets placed on the feed tray 91 and feeds the picked-up sheets onto the conveying belt 7 on a sheet-by-sheet basis. Then, the image forming unit 10 transfers the toner images formed by the process units 50 onto each sheet conveyed on the conveying belt 7. At this time, in color printing, respective toner images are formed by the process units 50Y, 50M, 50C, and 50K and superimposed on the sheet. Meanwhile, in monochrome printing, a toner image is formed only by the process unit 50K and transferred onto the sheet. After that, the image forming unit 10 feeds the sheet with the toner image(s) transferred thereon to the fuser 8, where the image forming unit 10 thermally fixes the toner image(s) onto the sheet. Thereafter, the image forming unit 10 ejects, onto the catch tray 92, the sheet with the toner image(s) fixed thereon.

[Configuration of Management Server]

As shown in FIG. 1, the management server 300 of the first embodiment includes a controller 50 that includes a CPU 51, a ROM 52, a RAM 53, and a flash memory 54. Further, the controller 50 is electrically connected with a network interface 57.

The ROM 52 stores processing programs configured to perform various types of processing for the print data, and various settings and initial values. The RAM 53 and the flash memory 54 are utilized as work areas for loading various processing programs thereinto or storage areas for temporarily storing the print data.

The CPU 51 is configured to perform a processing operation to process the print data while storing processing results into the RAM 53 or the flash memory 54 in accordance with the processing programs read out from the ROM 52.

Further, as shown in FIG. 5, the management server 300 includes a printer management table 340 that is a database for storing printer-related information such as information on the printer 100, a PC management table 350 that is a database for storing PC-related information such as information on the PC 200, and an extracting unit 330 configured to extract image data received from the PC 200 and create print job. The printer management table 340 and the PC management table 350 are retained in a memory area 310 (which includes the RAM 53 and the flash memory 54).

As shown in FIG. 3, the printer management table 340 is configured to store records each of which includes values for six items, i.e., "printer name," "ID," "printer information," "PC information," "job transmission time," and "printer operation," as information on a corresponding printer. For example, with respect to the printer 100, the "printer information" provides information on an address of the printer 100. The "PC information" provides information on an address of a PC utilizing the printer 100 (e.g., an IP address of the PC 200). The "job transmission time" represents an estimated time when the user is to transmit a print job to the printer 100. The "printer operation" represents a value to be changed from "0" to "1" when any operation of the operation panel 40 or the feed tray 91 is performed.

Further, as shown in FIG. 4, the PC management table 350 is configured to store records each of which includes values for five items, i.e., "PC name," "ID," "PC information," "login," and "login time," as information on a corresponding PC. For example, with respect to the PC 200, the "login" provides information as to whether a communication connection from the PC 200 to the management server 300 is established. The "login time" represents a time when the communication connection from the PC 200 to the management server 300 has been established.

The network interface 57 is an interface for achieving communication with other devices. The management server 300 receives, via the network interface 57, various requests transmitted from the printer 100 or the print job transmitted from the PC 200.

[Operation Environment of Image Processing System]

Subsequently, an explanation will be provided about a configuration and operations of the image processing system 900 including the printer 100, with reference to FIG. 5.

In the image processing system 900, when the PC 200 accepts account information for identifying the user (such as an ID and a password), the PC 200 logs in to the management server 300, and the communication connection between the PC 200 and the management server 300 is established. In addition, when the printer 100 accepts the account information in the same manner as the PC 200, the printer 100 signs in on the management server 300, and the communication connection between the printer 100 and the management server 300 is established.

Namely the image processing system 900 is configured such that when the PC 200 logs in to the management server 300 using the account information, and the printer 100 signs in on the management server 300 using the same account information, the PC 200 is allowed to specify the printer 100 and cause the specified printer 100 to perform printing.

In the disclosure, for the sake of descriptive convenience, such an operation that the user inputs the account information from the PC 200 into the management server 300 to establish the connection between the PC 200 and the management server 300 is referred to as "login." Further, such an operation that the user inputs the account information from the printer 100 into the management server 300 to establish the connection between the printer 100 and the management server 300 is referred to as "sign-in," distinctively from "login."

Further, in the disclosure, the connection/disconnection between the management server 300 and the printer 100 is not limited to a physical connection/disconnection. The connection between the management server 300 and the printer 100 contains a state where data communication is available between the management server 300 and the printer 100. Meanwhile, the disconnection (termination of the connection) between the management server 300 and the printer 100 contains a state where data communication is unavailable between the management server 300 and the printer 100.

In the image processing system 900 shown in FIG. 1, a printer 101 signs in on the management server 300 using the same account in the same manner as the printer 100. The PC 200 is allowed to select one of the printer options (i.e., the printers 100 and 101) displayed on a display unit of the PC 200, and cause the selected printer to perform printing.

For example, it is assumed that the PC 200 is logging in to the management server 300 with the ID of "account 1," the printer 100 is signing in on the management server 300 with the ID of "account 1," and the printer 101 is signing in on the management server 300 with the ID of "account 1." In this case, the PC 200 has the printers 100 and 101, which are signing in on the management server 300, set as available printer options.

Further, for instance, it is assumed that the user stores, into the PC 200, PDF-format image data and JPEG-format image data to be printed, puts the PC 200 in a location different from a LAN environment that the user regularly uses, and prints the PDF-format and JPEG-format image data using the printer 100 placed around the user.

In an environment where the image processing system 900 is available, when the PC 200 accepts from the user a print instruction directed to the printer 100, the PC 200 transmits the image data to the management server 300. In the management server 300, the extracting unit 330 extracts the image data and creates print data. Namely, the management server 300 serves as a printer driver. Then, the printer 100 receives the print data from the management server 300, and begins to perform printing based on the received print data.

According to the aforementioned printing procedure, however, the user might not identify the intended printer between the printers 100 and 101 merely by checking the printer options displayed on the display unit of the PC 200. In particular, as the number of printers rises, the user is more likely to fail to identify the intended printer.

To overcome the above problem, the user inputs information on the PC 200 (such as the IP address) into the printer 100 which the user intends to use, such that the printer 100 is displayed in a highlighted manner on (the display unit of) the PC 200. Thereby, the user is allowed to easily identify the intended printer.

Specifically, at the side of the printer 100 which the user intends to use, the user inputs the IP address of the PC 200 into the printer 100, and transmits the IP address from the printer 100 to the management server 300. The management server 300 creates an instruction or a command for causing the PC 200 to display thereon the printer 100 in a highlighted manner, and transmits the created instruction or command to the PC 200. In response to the instruction, the PC 200 highlights at least one of the printer options displayed thereon. Thereby, the user is allowed to easily identify the intended printer 100 on the PC 200.

Although the PC 201 is also logging in to the management server 300, the PC 201 is not a PC corresponding to the IP address entered into the printer 100. Therefore, the printer 100 is not highlighted on the PC 201.

[Control of Image Processing System]

Subsequently, an explanation will be provided about control of the printer 100 for achieving the aforementioned operations of the image processing system 900. The following description will mainly be directed to a sign-in process to be executed by the printer 100 and a highlight instructing process to be executed by the management server 300.

[Sign-In Process]

Referring to FIG. 6, the sign-in process will be described. The sign-in process is started when the user operates the operation panel 40 of the printer 100 to select an item "sign-in" and press an "OK" button.

Firstly, the CPU 31 shows, on the operation panel 40, a display (e.g., a message) to prompt the user to enter the account information, and accepts and stores on the RAM 33 the account information entered via the operation panel 40 (S101). The accepted account information contains an ID and a password.

Next, the CPU 31 shows, on the operation panel 40, a display to prompt the user to enter PC information, and accepts and stores on the RAM 33 the PC information entered via the operation panel 40 (S102). The accepted PC information contains information such as an IP address and a "PC name" of the corresponding PC.

Then, the CPU 31 determines whether there is a sign-in request issued to sign in on the management server 300, by determining whether the user has selected the item "sign-in" and pressed the "OK" button on the operation panel 40 (S103).

When determining that there is not a sign-in request issued to sign in on the management server 300 (S103: No), the CPU 31 waits for a sign-in request to be issued. It is noted that when there is not a sign-in request issued even after a lapse of a predetermined time period, the CPU 31 may terminate the sign-in process.

Meanwhile, when determining that there is a sign-in request issued to sign in on the management server 300 (S103: Yes), the CPU 31 signs in on the management server 300 using the account information stored on the RAM 33 and establishes the connection between the printer 100 and the management server 300 (S104).

Subsequently, the CPU 31 transmits the PC information and printer information to the management server 300 (S105), and then terminates the sign-in process. The transmitted printer information contains at least one of the IP address and the printer name of the printer 100.

[Highlight Instructing Process]

Referring to FIG. 7, the highlight instructing process will be described. The management server 300 launches the highlight instructing process when receiving the sign-in request from the printer 100, and the connection between the management server 300 and the printer 100 is established.

Firstly, the CPU 51 of the management server 300 determines whether the management server 300 has received the PC information from the printer 100 (S201). When determining that the management server 300 has not received the PC information from the printer 100 (S201: No), the CPU 51 terminates the highlight instructing process.

Meanwhile, when determining that the management server 300 has received the PC information from the printer 100 (S201: Yes), the CPU 51 performs a highlight determining process (S202).

[Highlight Determining Process]
Referring to FIGS. 3 and 4, the highlight determining process will be described based on an assumption that the user has entered the IP address "200. 168. 0. 1" of the PC 200 as the PC information. The assumption means that the user has issued such an instruction that the printer 100 is displayed in a highlighted manner on the PC 200.

Firstly, the CPU 51 stores the received PC information as a value for the item "PC information" of the printer management table 340 (S301). Then, the CPU 51 determines whether the PC corresponding to the PC information stored on the printer management table 340, i.e., the PC 200 is logging in to the management server 300 (S305).

For example, the CPU 51 refers to a record on the PC management table 350 that contains the same PC information as received. When the item "login" of the record is "ON," the CPU 51 determines that the PC 200 is logging in to the management server 300. It is noted that the CPU 51 is configured to perform a separate process to set the value for the item "login" of the PC management table 350 to "ON" when the PC 200 logs on to the management server 300, and set the value for the item "login" to "OFF" when the PC 200 logs out from the management server 300.

When determining that the PC 200 is not logging in to the management server 300 (S305: No), the CPU 51 waits for the PC 200 to log in to the management server 300.

Meanwhile, when determining that the PC 200 is logging in to the management server 300 (S305: Yes), the CPU 51 issues a highlight instruction for highlighting the printer 100 on the PC 200 (S310). Then, the CPU 51 terminates the highlight determining process.

Referring back to FIG. 7, the CPU 51 determines whether the CPU 51 has issued the highlight instruction in the highlight determining process (S203). When determining that the CPU 51 has issued the highlight instruction in the highlight determining process (S203: Yes), the CPU 51 creates a highlight command for instructing (causing) the PC 200 to highlight the printer 100 thereon, and transmits the created command to the PC 200 so as to instruct the PC 200 to display thereon the printer 100 in a highlighted manner (S204). Then, the CPU 51 terminates the highlight instructing process.

It is noted that methods for displaying the printer 100 in a highlighted manner in the case where the printers 100 and 101 are displayed on the PC 200 as printer options may include highlighting the printer 100 in boldface type, in italics, with an underline, in a shaded manner, with a different color, and by adding a double circle.

Meanwhile, when determining that the CPU 51 has not issued the highlight instruction in the highlight determining process (S203: No), the CPU 51 provides the printer 100 with an error notification that the printer 100 is not highlighted on the PC 200 (S205). Then, the CPU 51 terminates the highlight instructing process.

Advantageous Effects of First Embodiment

As described above in detail, in the management server 300 of the first embodiment, when determining that the management server 300 has received the PC information from the printer 100 (S201: Yes), the CPU 51 performs the highlight determining process (S202). Next, when determining that the CPU 51 has issued the highlight instruction in the highlight determining process (S203: Yes), the CPU 51 creates the highlight command for causing the PC 200 to highlight the printer 100 thereon, and transmits the created command to the PC 200 (S204). Therefore, the user is allowed to easily identify the intended printer 100 on the PC 200.

Further, when determining that the PC 200 is logging in to the management server 300 (S305: Yes), the CPU 51 issues a highlight instruction for highlighting the printer 100 on the PC 200 (S310). Then, when determining that the CPU 51 has issued the highlight instruction in the highlight determining process (S203: Yes), the CPU 51 creates the highlight command for causing the PC 200 to highlight the printer 100 thereon, and transmits the created command to the PC 200 (S204). Hence, when the PC 200 establishes the connection with the management server 300, it is presumed that the user must have a solid intention to use the printer 100. Thus, by displaying the printer 100 (which is presumed to be an intended printer of the user) when the connection between the PC 200 and the management server 300 is established, it is possible to improve user-friendliness of the image processing system 900.

Further, as described above in detail, in the printer 100 of the first embodiment, the CPU 31 signs in on the management server 300 using the account information stored on the RAM 33 and establishes the connection between the printer 100 and the management server 300 (S104). Subsequently, the CPU 31 transmits the PC information and the printer information to the management server 300 (S105). Thus, as the management server 300 receives from the printer 100 the IP address for identifying, the PC 200 which is to utilize the printer 100, the management server 300 is allowed to instruct the PC 200 to highlight the printer 100. Thereby, it is possible for the user to easily identify the intended printer 100 on the PC 200.

Second Embodiment

A second embodiment according to aspects of the present invention will be described. The second embodiment has such a feature distinct from the aforementioned first embodiment that, in a highlight determining process, when the account information received from the PC 200 is identical to the account information received from the printer 100, the CPU 51 of the management server 300 issues the highlight instruction.

[Configuration of Image Processing System]
The second embodiment will be described based on the following assumption. That is, as shown in FIG. 9, the printer 100 is signing in on the management server 300 using the ID "account 1." In addition, the printer 101 is signing in on the management server 300 using the ID "account 2." Further, the PC 200 is used in common by a user having the ID "account 1" and a user having the ID "account 2," and logging in to the management server 300 using one of the ID "account 1" and the ID "account 2." Further, the IP address of the PC 200 is input into the printer 100 and the printer 101.

In this case, since the printer 100 and the printer 101 are highlighted on the PC 200, it is difficult for a user to identify an intended one of the printers 100 and 101.

To overcome the problem, in the second embodiment, one of the printers 100 and 101 that corresponds to the account information of the PC 200 is highlighted. Specifically, when the PC 200 is logging in to the management server 300 using the ID "account 1," the PC 200 highlights the printer 100 thereon. Further, when the PC 200 is logging in to the management server 300 using the ID "account 2," the PC 200 highlights the printer 101 thereon.

[Highlight Determining Process]

Referring to FIG. 10, a highlight determining process of the second embodiment will be described. Firstly, the CPU 51 stores the received PC information on the RAM 53 (S301). When determining that the PC 200 is logging in to the management server 300 (S305: Yes), the CPU 51 determines whether the account information received from the PC 200 is coincident with the account information received from the printer 100 (S306).

The determination in S306 is made by referring to respective records on the printer management table 34 and the PC management table each of which contains the same IP address for PC. More specifically, the IP address "200. 168. 0. 1" for PC is contained in the record of the printer 100 and the record of the PC 200. The record of the printer 100 contains the ID "account 1." The record of the PC 200 contains the ID "account 1," which is identical to the ID contained in the record of the printer 100. Thus, in S306, the CPU 51 determines that the account information received from the PC 200 is coincident with the account information received from the printer 100.

When determining that the account information received from the PC 200 is coincident with the account information received from the printer 100 (S306: Yes), the CPU 51 issues a highlight instruction for highlighting the printer 100 on the PC 200 (S310). Then, the CPU 51 terminates the highlight determining process.

Meanwhile, when determining that the account information received from the PC 200 is not coincident with the account information received from the printer 100 (S306: No), the CPU 51 terminates the highlight determining process. It is noted that when making the negative determination in S306 as above (S306: No), the CPU 51, without issuing the highlight instruction, provides the printer 100 with an error notification that the printer 100 is not highlighted on the PC 200 (S205) in the highlight instructing process as shown in FIG. 7.

Advantageous Effects of Second Embodiment

As described above in detail, in the management server 300 of the second embodiment, when determining that the account information received from the PC 200 is not coincident with the account information received from the printer 100 (S306: No), the CPU 51 terminates the highlight determining process. In this case, without issuing the highlight instruction, the CPU 51 provides the printer 100 with the error notification. Thus, when a different user (from the signing-in user), whose account information is not coincident with the account information used by the printer 100 signing in on the management server 300, utilizes the PC 200, the printer 100 is not highlighted on the PC 200. Therefore, the second embodiment provides such improved user-friendliness as to avoid confusion for the different user whose account information is not coincident with the account information used by the printer 100.

Third Embodiment

A third embodiment according to aspects of the present invention will be described. The third embodiment has such a feature distinct from the aforementioned first and second embodiments that a job transmission time when a print job is to be transmitted to the printer 100 is previously input from the printer 100 in a sign-in process, and the CPU 51 of the management server 300 does not issue the highlight instruction when determining that a PC has logged in to the management server 300 after the job transmission time, in a highlight determining process.

[Sign-In Process]

Referring to FIG. 11, a sign-in process of the third embodiment will be described. The sign-in process is started when a user operates the operation panel 40 of the printer 100 to select the item "sign-in" and press the "OK" button.

Firstly, the CPU 31 accepts the account information (S101), and then accepts the PC information (S102). Subsequently, the CPU 31 shows, on the operation panel 40, a display (e.g., a message) to prompt the user to enter a job transmission time (S401). The job transmission time is an estimated time when the user is to transmit a print job from a PC to the printer 100.

Then, when determining that there is a sign-in request issued to sign in on the management server 300 (S103: Yes), the CPU 31 signs in on the management server 300 using the account information stored on the RAM 33 (S104).

Then, the CPU 31 transmits the PC information and the printer information to the management server 300 (S105). Thereafter, the CPU 31 transmits the job transmission time (S402), and terminates the sign-in process.

[Highlight Determining Process]

Referring to FIG. 12, a highlight determining process of a third embodiment will be described. Firstly, the CPU 51 stores, onto the RAM 53, the PC information received from the printer 100 (S301). Further, the CPU 51 stores the job transmission time received from the printer 100, into the record of the printer 100 on the printer management table 340 (S302). Subsequently, the CPU 51 determines whether the PC 200 is logging in to the management server 300 (S305).

When determining that the PC 200 is logging in to the management server 300 (S305: Yes), the CPU 51 determines whether a login time when the PC 200 has logged in to the management server 300 is equal to or earlier than the job transmission time (S307).

It is noted that, before the determination in S307, the CPU 51 refers to respective records on the printer management table 340 and the PC management table 350 each of which contains the same PC information as received, and acquires the job transmission time and the login time from the printer management table 340 and the PC management table 350, respectively. Further, each time a PC (e.g., the PC 200) logs in to the management server 300, the latest login time is stored on the PC management table 350.

When determining that the login time is equal to or earlier than the job transmission time (S307: Yes), the CPU 51 issues the highlight instruction (S310), and then terminates the highlight determining process.

When determining that the login time is not equal to or earlier than the job transmission time (i.e., the login time is later than the job transmission time) (S307: No), the CPU 51 terminates the highlight determining process.

Advantageous Effects of Third Embodiment

As described above in detail, in the management server 300 of the third embodiment, when determining that the login time is later than the job transmission time (S307: No), the CPU 51 terminates the highlight determining process without issuing the highlight instruction. In such a case, since the user does not log in to the management server 300 even after the job transmission time, it is presumed that the user may have canceled the user's plan to use the printer 100. Furthermore, in the case, it is presumed that the user is likely to forget that the user has intended to highlight the printer 100 on the PC 200. Therefore, by preventing the printer 100 from being highlighted on the PC 200 in the aforementioned case, the third embodiment provides such improved user-friendliness as to avoid confusion that the user, who must not have such a solid intention to use the printer 100, might have when seeing the printer 100 highlighted on the PC 200.

Fourth Embodiment

A fourth embodiment according to aspects of the present invention will be described. The fourth embodiment has such a feature distinct from the aforementioned third embodiment that the job transmission time is previously input from the printer 100, and, in a highlight determining process, the CPU 51 of the management server 300 does not issue the highlight instruction when determining that the printer 100 has been operated by a different user (from the signing-in user) after the job transmission time.

[Highlight Determining Process]

Referring to FIG. 13, a highlight determining process of a fourth embodiment will be described. It is noted that the steps of S301 to S307 are the same as those of the first embodiment.

When determining that the login time is later than the job transmission time (S307: No), the CPU 51 determines whether the printer 100 has been operated after the job transmission time (S308).

In the determination in S308, specifically, when referring to the item "printer operation" on the printer management table 340 and confirming that the value "1" is stored for the item "printer operation" on the printer management table 340, the CPU 51 determines that the printer 100 has been operated. Further, when the operation panel 40 of the printer 100 is operated after the job transmission time, the printer 100 sends to the management server 300 a notification that (the operation panel 40 of) the printer 100 has been operated. Meanwhile, upon receiving from the printer 100 the notification that (the operation panel 40 of) the printer 100 has been operated, the management server 300 performs an operation to change the value for the item "printer operation" with respect to the record of the printer 100 on the printer management table 340 from "0" to "1."

Further, the printer 100 may be configured to send to the management server 300 a notification that the printer 100 has been operated, when an expendable item such as sheets and toner is replaced in the printer 100 after the job transmission time. For example, the printer 100 may be configured to determine that replacement of sheets has been carried out, when the feed-tray open-closed detection sensor 35 (which includes a known sensor) detects an event that the feed tray 91 has been opened and closed. Further, the printer 100 may be configured to determine that replacement of toner has been carried out, when the cover open-closed detection sensor 36 (which includes a known sensor) detects an event that the cover, which is configured to, when opened, allow the user to access the process units 50, has been opened and closed.

When determining that the printer 100 has not been operated after the job transmission time (S308: No), the CPU 51 issues the highlight instruction (S310). After that, the CPU 51 terminates the highlight determining process.

Meanwhile, when determining that the printer 100 has been operated after the job transmission time (S308: Yes), the CPU 51 terminates the highlight determining process.

Advantageous Effects of Fourth Embodiment

As described above in detail, the management server 300 of the fourth embodiment terminates the highlight determining process without issuing the highlight instruction, when determining that the printer 100 has been operated after the job transmission time (S308: Yes).

In the image processing system 900, after the printer 100 signs in on the management server 300, the operation panel 40 of the printer 100 is hardly operated for printing. Therefore, when the operation panel 40 is operated after the printer 100 signs in on the management server 300, it is presumed that the operation panel 40 is likely to be operated by a different user (from the signing-in user). Additionally when the operation panel 40 is presumed to be operated by a different user, it is presumed that the signing-in user is not likely to be in front of the printer 100 and must not have such a solid intention to perform printing. In this case, it is presumed that the signing-in user is likely to forget that the signing-in user has intended to highlight the printer 100 on the PC 200. Thus, by preventing the management server 300 from issuing the highlight instruction (i.e., preventing the printer 100 from being highlighted on the PC 200) in the aforementioned case, the fourth embodiment provides such improved user-friendliness as to avoid confusion that the user, who must not have such a solid intention to use the printer 100, might have when seeing the printer 100 highlighted on the PC 200.

Further, in the image processing system 900, before the printer 100 signs in on the management server 300, the user visually recognizes (information displayed on) the operation panel 40. Therefore, when there is something abnormal such as shortage of an expendable item such as sheets and toner, the user should realize the abnormality before sign-in, and is likely to perform an operation to settle the abnormality (such as replacement of the expendable item) before sign-in. When an operation to settle the abnormality (such as replacement of the expendable item) is carried out after the printer 100 signs in on the management server 300, it is presumed that the operation is likely to be carried out by a different user (from the signing-in user). Hence, when the operation to settle the abnormality (such as replacement of the expendable item) is carried out by a different user, the signing-in user is not likely to be in front of the printer 100, and must not have such a solid intention to perform printing. In this case, it is presumed that the signing-in user is likely to forget that the signing-in user has intended to highlight the printer 100 on the PC 200. Thus, by preventing the management server 300 from issuing the highlight instruction (i.e., preventing the printer 100 from being highlighted on the PC 200) in the aforementioned case, the fourth embodiment provides such improved user-friendliness as to avoid confusion for the user who must not have such a solid intention to use the printer 100.

Hereinabove, the embodiments according to aspects of the present invention have been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only exemplary embodiments of the present invention and but a few examples of their versatility are shown and described in the present disclosure. It is to be understood that the present invention is capable of use in various other combinations and environments and is capable of changes or modifications within the scope of the inventive concept as expressed herein. For example, the following modifications are possible.

[Modifications]

In the image processing system 900, the printer 100 may be replaced with a multi-function peripheral or a copy machine having a printing function.

In the aforementioned embodiments, aspects of the present invention are applied to the printer 100 configured to perform electro-photographic printing. However, aspects of the present invention may be applied to any of a printing device, a facsimile machine, an image scanner, and a copy machine having an inkjet printing function. Further, aspects of the present invention may be applied to a device having a color printing function or a device having only a monochrome printing function.

In the aforementioned embodiments, the user directly enters the printer name and the account information via the operation panel 40. However, the printer name and the account information may be entered via remote control form the PC 200.

In the aforementioned embodiments, the flash memory 34 is used as a nonvolatile memory of the printer 100. However, a nonvolatile RAM (NVRAM) may be used as a nonvolatile memory of the printer 100. The same applies to the management server 300.

In the aforementioned second embodiment, the highlight instruction is issued when the PC 200 logs in to the management server 300. However, the highlight instruction may be issued when the PC 200 issues a print request to the printer 100 via the management server 30, or when a screen for selecting one of the printer options (e.g., the printers 100 and 101) is displayed on the PC 200.

What is claimed is:

1. A server comprising:
    a connection unit configured to connect with an information processing device and a plurality of image processing devices;
    a first receiving unit configured to receive image processing device information for identifying a specified one of the plurality of image processing devices that is to be used by the information processing device, from the specified image processing device via the connection unit;
    a second receiving unit configured to receive information processing device information for identifying the information processing device, from the specified image processing device via the connection unit;
    a transmission unit configured to transmit, to the information processing device identified by the information processing device information, a display instruction for causing the information processing device to display thereon the specified image processing device identified by the image processing device information, via the connection unit;
    an operation information acquiring unit configured to acquire operation information as to whether the specified image processing device has been operated, from the specified image processing device identified by the image processing device information; and
    a determining unit configured to determine whether the specified image processing device has been operated while a connection has been established between the server and the information processing device, based on the operation information acquired by the operation information acquiring unit,
    wherein the transmission unit is configured to:
    transmit the display instruction to the information processing device, when the determining unit determines that the specified image processing device has been operated while the connection between the server and the information processing device has been established; and
    not transmit the display instruction to the information processing device, when the determining unit determines that the specified image processing device has been operated while the connection between the server and the information processing device has not been established.

2. The server according to claim 1,
    wherein the transmission unit is configured to transmit the display instruction to the information processing device when a connection is established between the server and the information processing device.

3. The server according to claim 2, further comprising:
    a third receiving unit configured to receive user information from the specified image processing device identified by the image processing device information;
    a fourth receiving unit configured to receive user information from the information processing device identified by the information processing device information; and
    a determining unit configured to determine whether the user information received from the specified image processing device by the third receiving unit is coincident with the user information received from the information processing device by the fourth receiving unit,
    wherein the transmission unit is configure to:
    transmit the display instruction to the information processing device, when the determining unit determines that the user information received from the specified image processing device is coincident with the user information received from the information processing device; and
    forbid transmission of the display instruction to the information processing device, when the determining unit determines that the user information received from the specified image processing device is not coincident with the user information received from the information processing device.

4. The server according to claim 1, further comprising:
    a job transmission time receiving unit configured to receive a job transmission time that is an estimated time when a print job is to be transmitted to the specified image processing device, from the specified image processing device identified by the image processing device information;
    a connection time acquiring unit configured to acquire a connection time that is a time when a connection has been established between the server and the information processing device;
    an operation information acquiring unit configured to acquire operation information as to whether the specified image processing device has been operated, from the specified image processing device identified by the image processing device information; and
    a determining unit configured to determine whether the specified image processing device has been operated before the connection time after the job transmission time, based on the received job transmission time, the acquired connection time, and the acquired operation information,
    wherein the transmission unit is configure to forbid transmission of the display instruction to the information processing device, when the determining unit determines that the specified image processing device has been operated before the connection time after the job transmission time.

5. The server according to claim 1,
wherein the operation information is information as to her an operation unit of the specified image processing device has been operated.

6. The server according to claim 1,
wherein the operation information is information as to whether a cover of the specified image processing device has been operated, the cover being configured to, when opened, allow an access to an expendable item for the specified image processing device.

7. The server according to claim 1, further comprising:
a job transmission time receiving unit configured to receive a job transmission time that is an estimated time when a print job is to be transmitted to the specified image processing device, from the specified image processing device identified by the image processing device information;
a connection time acquiring unit configured to acquire a connection time that is a time when a connection has been established between the server and the information processing device; and
a determining unit configured to determine whether the connection time is equal to or earlier than the job transmission time, based on the job transmission time received by the job transmission time receiving unit and the connection time acquired by the connection time acquiring unit,
wherein the transmission unit is configure to forbid transmission of the display instruction to the information processing device, when the determining unit determines that the connection time is not equal to or earlier than the job transmission time.

8. An image processing system comprising:
an information processing device;
a plurality of image processing devices; and
a server configured to mediate communication between the information processing device and the plurality of image processing devices so as to allow the information processing device to communicate with the plurality of image processing devices via the server,
wherein each of the plurality of image processing devices comprises:
 a connection unit configured to connect with the server;
 an accepting unit configured to accept an entry of information processing device information for identifying the information processing device that is to use the image processing device;
 a transmission unit configured to transmit, to the server via the connection unit, image processing device information for identifying the image processing device and the information processing device information accepted by the accepting unit,
wherein the server comprises:
 a server-side connection unit configured to connect with the information processing device and the plurality of image processing devices;
 a first receiving unit configured to receive the image processing device information for identifying a specified one of the plurality of image processing devices that is to be used by the information processing device, from the specified image processing device via the server-side connection unit;
 a second receiving unit configured to receive the information processing device information for identifying the information processing device, from the specified image processing device via the server-side connection unit;
 a server-side transmission unit configured to transmit, to the information processing device identified by the information processing device information, a display instruction for causing the information processing device to display thereon the specified image processing device identified by the image processing device information received by the first receiving unit, via the server-side connection unit,
 an operation information acquiring unit configured to acquire operation information as to whether the specified image processing device has been operated, from the specified image processing device identified by the image processing device information; and
 a determining unit configured to determine whether the specified image processing device has been operated while a connection has been established between the server and the information processing device, based on the operation information acquired by the operation information acquiring unit,
wherein the server-side transmission unit is configured to:
transmit the display instruction to the information processing device, when the determining unit determines that the specified image processing device has been operated while the connection between the server and the information processing device has been established; and
not transmit the display instruction to the information processing device, when the determining unit determines that the specified image processing device has been operated while the connection between the server and the information processing device has not been established.

9. A server comprising:
a communication unit configured to communicate with an image forming device configured to form an image on a sheet and an information processing device via a network; and
a controller configured to:
receive first device information that identifies the image forming device on the network and first user information that identifies a user who uses the image forming device, from the image forming device via communication unit;
receive second device information that identities the information processing device on the network and second user information that identifies a user who uses the information processing device, from the information processing device via the communication unit;
receive trigger information from the image forming device via the communication unit;
determine whether the user identified by the first user information and the user identified by the second user information are coincident with each other, when the trigger information is received via the communication unit from the image forming device identified by the first device information;
transmit, via the communication unit to the information processing device identified by the second device information, a display instruction to cause the information processing device to display information about the image forming device identified by the first device information, when determining that the user identified by the first user information and the user identified by the second user information are coincident with each other;

avoid transmitting the display instruction to the information processing device identified by the first device information, when determining that the user identified by the first user information and the user identified by the second user information are not coincident with each other acquire operation information as to whether the image forming device has been operated, from the image forming device identified by the first device information; and determine whether the image forming device has been operated while a connection has been established between the server and the information processing device, based on the operation information acquired by the operation information acquiring unit, transmit the display instruction to the information processing device, when the determining unit determines that the image forming device has been operated while the connection between the server and the information processing device has been established; and not transmit the display instruction to the information processing device, when the determining unit determines that the specified image forming device has been operated while the connection between the server and the information processing device has not been established.

10. The server according to claim 9, wherein the trigger information includes the second device information that identifies the information processing device on the network.

11. The server according to claim 9, wherein the first device information includes an IP address of the image forming device on the network, the second device information includes an IP address of the information processing device on the network, and the trigger information includes the IP address of the information processing device on the network.

* * * * *